March 31, 1964
C. B. HENDERSON ETAL
3,126,701
PROCESS FOR GENERATING GASES
Filed Feb. 5, 1959
4 Sheets-Sheet 1
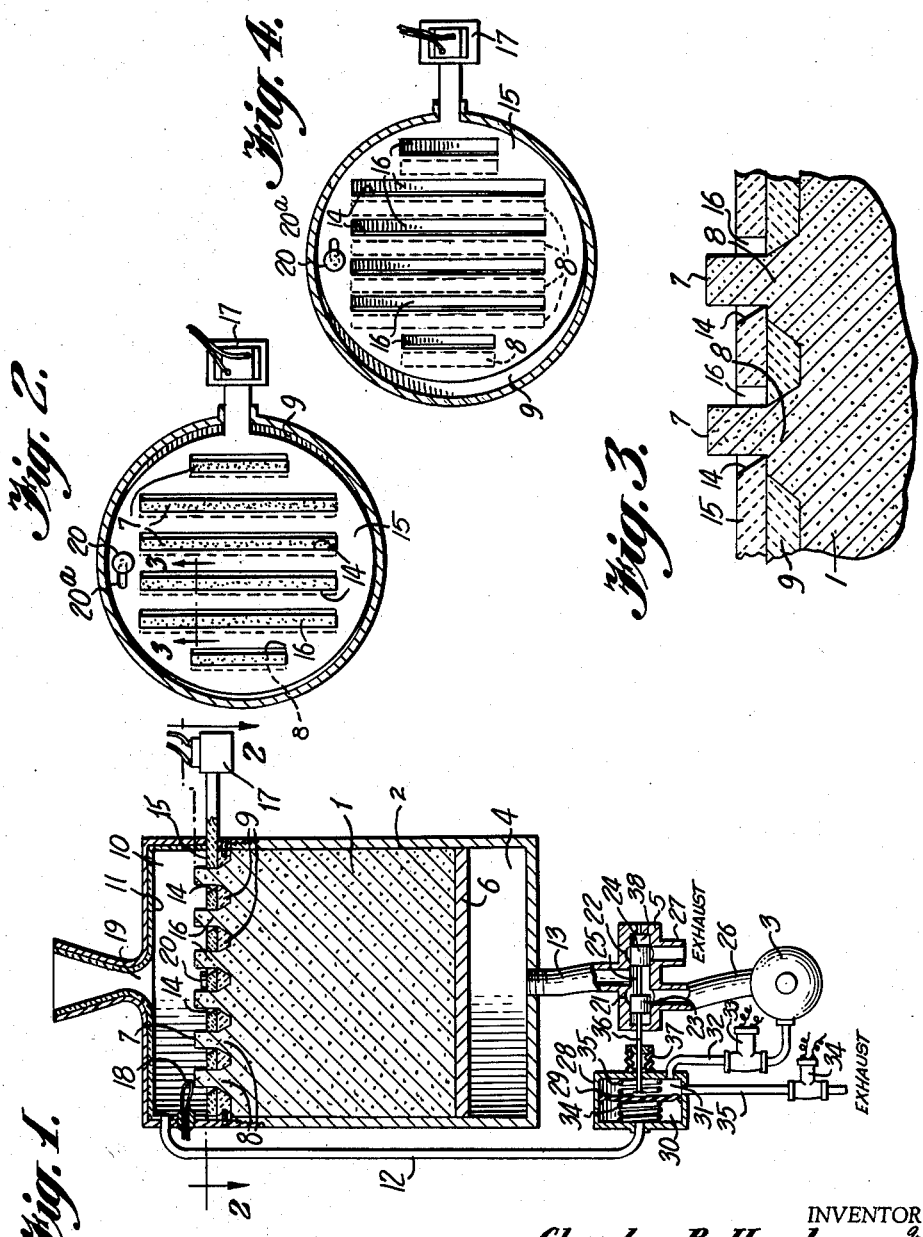
INVENTORS
*Charles B. Henderson 3rd*
*Joe M. Burton*
BY *Martha L. Ross*
AGENT

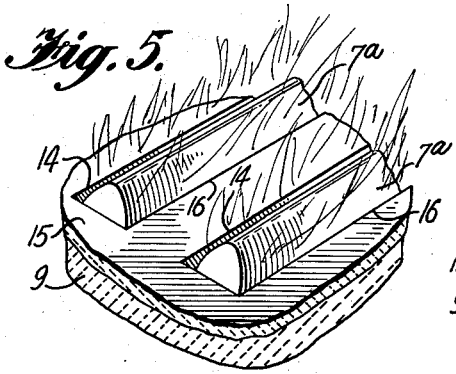
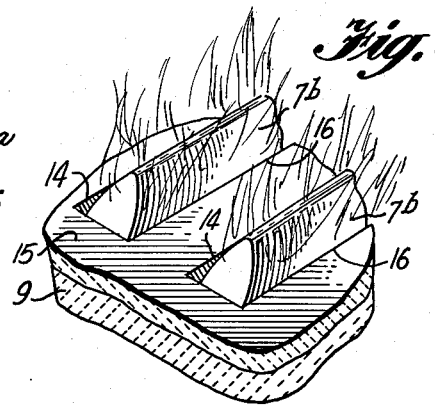
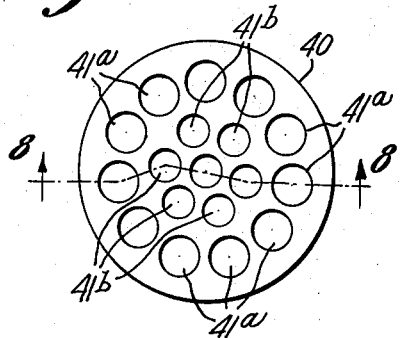
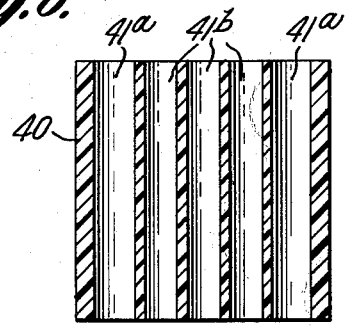
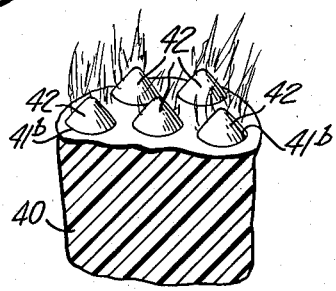
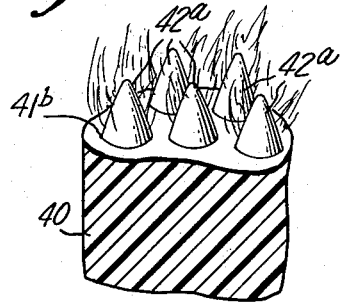

March 31, 1964  C. B. HENDERSON ETAL  3,126,701
PROCESS FOR GENERATING GASES

Filed Feb. 5, 1959  4 Sheets-Sheet 3

INVENTORS
*Charles B. Henderson 3rd*
*Joe M. Burton*
BY *Martha L. Ross*
AGENT

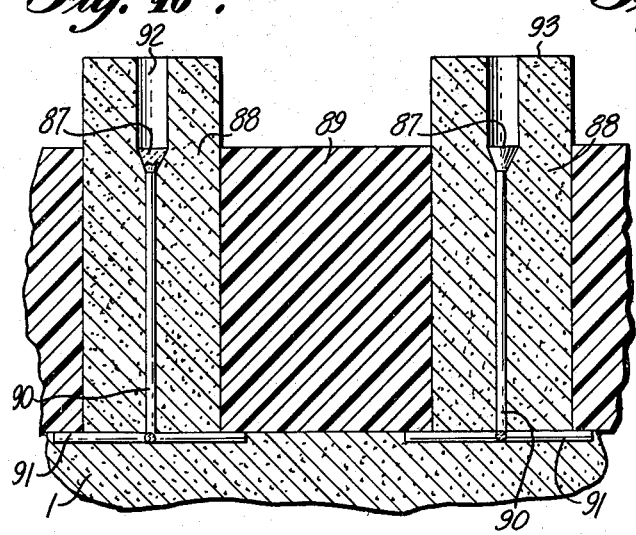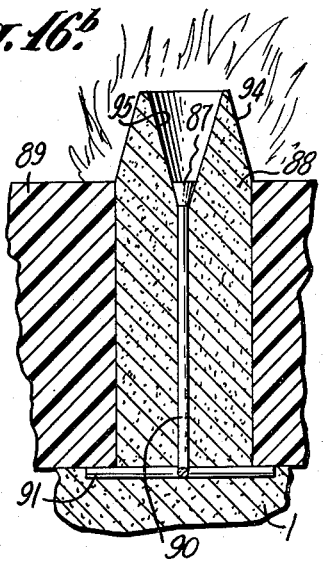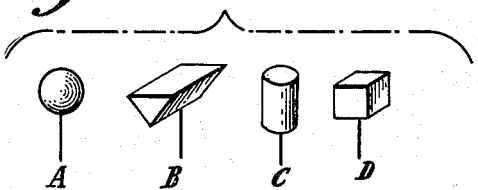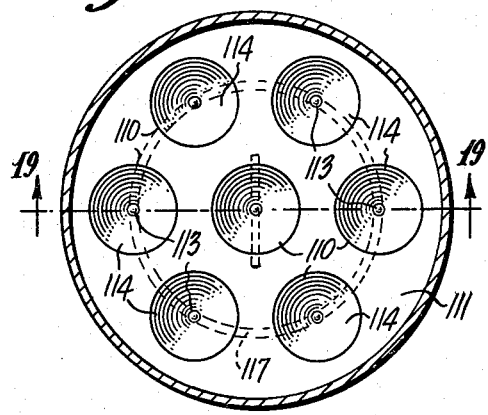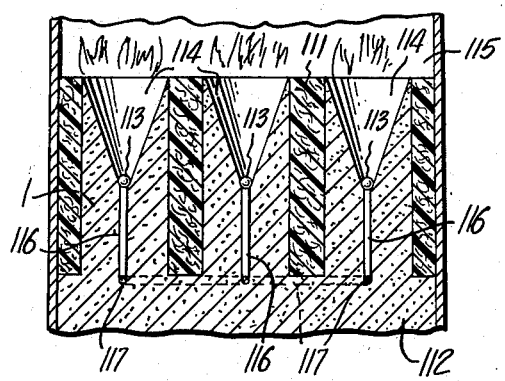

3,126,701
PROCESS FOR GENERATING GASES
Charles B. Henderson, Alexandria, and Joe M. Burton, Springfield, Va., assignors to Atlantic Research Corporation, Alexandria, Va., a corporation of Virginia
Filed Feb. 5, 1959, Ser. No. 791,487
22 Claims. (Cl. 60—35.4)

This invention relates to a new process for generating gases by combustion of a plastic, extrudable monopropellant for such purposes as producing thrust, power, heat energy or gas pressure and apparatus therefor.

The term monopropellant refers to a composition which is substantially self-sufficient with regard to its oxidant requirements as distinguished from bipropellants where the fuel is maintained separately from the oxidizer source until admixture at the point of combustion.

Generation of gases for producing thrust, as in a jet motor, or as a prime mover, as in a gas turbine, has hitherto generally been accomplished either by burning atomized sprays of mobile liquid mono- or bipropellant injected from a storage tank or tanks into the combustion chamber or by combustion of a solid propellant grain housed in the combustion chamber. Although each of these methods possesses desirable advantages relative to the other, each is also characterized by undesirable features.

The use of mobile liquid monopropellants, namely propellants which are injectable into a combustion chamber in the form of finely divided droplets or sprays, has the following important advantages. The mass burning rate and, thereby the volume of combustion gases produced are controllable by varying the rate of injection. Combustion can be stopped by shutting off flow and resumed at will. Performance is not dependent upon the temperature environment of the system. Duration of operation is limited only by capacity of the storage tanks or reservoirs. Liquid monopropellants, furthermore, possess an important advantage over liquid bipropellants since the former require only one storage tank, one propellant pump, and one set of feed lines and valves, and eliminate elaborate systems for ensuring properly proportioned flow of the separate fuel and oxidizer components and their adequate admixture in the combustion chamber.

However, the usual mobile liquid monopropellants are characterized by disadvantages such as low density, low specific impulse, high toxicity, excessive sensitivity to heat and shock resulting in detonation, and corrosiveness to various parts of the system, such as valves. When used in a rocket motor, there is some tendency for unburned droplets of the liquid propellant to leave the combustion chamber and to be cooled during expansion in the nozzle before combustion occurs. Performance may also be affected by attitude of the system.

Not only is a complex system of tubing, valves, and usually pumps required to fill the liquid propellant tanks and to move the propellant from there into the combustion chamber, but provision must be made to purge the system of propellant after test firings are made. Metal catalysis problems are sometimes encountered in passing the liquid through the complex system. Catalyst beds are required for combustion of some liquid monopropellants and vibration of the system often poses problems of retaining the bed firmly lxed in the combustion chamber. Storage and transportation of liquid propellants is also a problem because of their tendency to leak readily. Such leakage presents both a fire and toxicity hazard.

Solid propellants, as a means for generating gases, possess the advantages of high density, low heat and shock sensitivity, good stability, long storageability, absence of leakage, low corrosiveness and toxicity, and elimination of propellant filling and injection equipment and controls since, all of the solid propellant is contained directly in the combustion chamber. Solid propellants do not require purging of the system after test firing, do not need an external combustion catalyst, and are not affected by the attitude of the system.

Such gas generating, solid propellant systems do, however, possess a number of disadvantages. The solid grain must be sufficiently strong and free from mechanical flaws so that it does not crack or shatter under pressure or vibrational stresses. Many solid propellants also tend to become excessively brittle at low ambient temperatures and thereby subject to fracture. Cracking or shattering of the propellant grain in the combustion chamber may cause such a large, uncontrolled increase in burning surface that the walls of the combustion chamber cannot withstand the pressure. Although a burning solid propellant grain can be quenched, if necessary, by suitable means, reignition is not feasible, so that the unburned portion is a total loss and intermittency of operation is impractical. Ambient temperature of the propellant grain is an important parameter in determining burning rate and cannot be compensated for during use by variation of the area of burning surface.

Solid propellant grains must be predesigned and preshaped with respect to burning surface area for each particular application, since such area is set for a given grain and cannot subsequently be varied. This makes necessary the production and storage of a large variety of grains of different design. Such predesigned solid propellant grains cannot compensate during burning to variations in operational requirements or to different ambient temperatures. The only way in which a solid propellant gas-generating composition can be designed to meet unforeseen operational requirements is to produce an adequate supply of gases at the extremes of high usage requirements and low ambient temperature, which in most cases necessitates venting and washing surplus gas at other operating conditions. Wastage in this manner can be as high as 80% of the gas produced and provides a design problem in terms of a modulating valve which can withstand the high temperature exhaust gases. Size of the grains must also be predetermined and permits no subsequent variation in amount consumed unless waste of an unburned portion of the grain poses no economic or other problem. Maximum duration of burning time or thrust is considerably shorter than that which can be provided by a liquid propellant which is limited largely by storage capacity of the reservoir.

The combustion chamber must be of sufficient size to accommodate all of the propellant and, therefore, is generally larger than required for combustion of a liquid propellant. Since the walls of the entire combustion chamber must be strong enough to withstand the high combustion gas pressures and completely insulated or otherwise cooled to withstand the high combustion gas temperatures, this may pose a more serious weight problem than that of a propellant storage tank. The geometry of the combustion chamber is, furthermore, immobilized by the design requirements of the propellant grain and cannot, in many cases, be adapted to the particular structural needs of the device as a whole.

Scurlock et al. application Serial No. 694,894, filed November 6, 1957, discloses a highly advantageous method for generating gases which comprises extruding a plastic monopropellant composition, having sufficient cohesive strength to retain a formed shape and capable of continuous flow at ordinary to reduced temperatures under pressure, from a storage chamber into a combustion chamber in the form of any desired coherent shape, such as a column, strip, or the like and burning the leading face of the continuously advancing material in the combustion chamber. The leading face of the shape-retaining mass thus presents a burning surface of predeterminable area which can be varied and controlled by varying the rate of extrusion, and/or varying the size and shape of the cross-sectional area of the feeding or extrusion orifices or tubes, and/or by shaping or recessing the leading face of the advancing mass to increase the available burning surface by suitable means. The extent of overall burning surface area can also be regulated by providing a plurality of feeding orifices or tubes which can be varied in number. Thus, mass burning rate of the monopropellant and the amount and pressure of combustion gases generated can easily be regulated by controlled feeding.

In this way, the rate of gas generation can be tailored to particular requirements both before and during operation within limits set by the particular properties of the monopropellant compositions and the structural limitations of the rocket, gas generator or other device. Similarly, factors affecting burning rate of the propellant material, such as its ambient temperature or pressure conditions in the combustion chamber, can be compensated for by controlling feeding rate or adjustment of the size or shape of the mass of extruded propellant.

Because of the fluidity of the material under stress at ambient temperatures, the monopropellant can be fed into the combustion chamber at a rate adjusted to the desired mass burning rate of the composition so that at equilibrium or steady-state burning, namely when the mass burning rate does not vary with time, the burning surface of the continuously extruding propellant remains substantially stationary relative to the walls of the combustion chamber. Since burning is confined to a well-defined burning surface area, much as in the case of the burning of solid propellant grains, combustion chamber length requirements are generally quite small, both as compared with that needed for complete reaction of sprayed or atomized conventional mobile liquid propellants and for housing of conventional solid propellant grains. This makes possible a substantial saving in dead weight, since the combustion chamber not only must be built to withstand the high combustion gas pressures, but must also be heavily insulated and made of materials, generally heavy, such as alloy steel or nickel alloys, such as Inconel, which are resistant to the corrosive gases. Unlike solid propellant combustion chambers, which must conform to design requirements of the propellant grain, the combustion chamber can be designed to meet the shape or other requirements of the particular gas generator device.

Duration of combustion is limited only by the capacity of the monopropellant storage container and appropriate means for cooling the walls of the combustion chamber, where necessary, and can be continuous or intermittent. Combustion can be quenched at any time by any suitable means, such as a cut-off device which shuts off further propellant extrusion into the combustion space, and can be reinitiated by opening the shut-off mechanism and reigniting the leading face of the extruding propellant. In some applications, intermittency of operation is not necessary and a cut-off mechanism can be dispensed with, although it may be desirable in such a situation to seal off the propellant in the storage chamber from the combustion chamber by means which can be opened or ruptured when operation begins.

Another advantage stems from the substantial non-fluidity of the monopropellants except under stress since, unlike mobile liquids it makes the system substantially immune to attitude. This makes unnecessary elaborate precautions to maintain the stored propellant during operation in constant communication with a pumping means or the feeding orifice into the combustion chamber.

Controllable feeding of the monopropellant eliminates the wastage encountered with solid propellants by permitting regulation both before and during operatioin to meet environmental factors and varying operational needs and the necessity for manufacturing and storing a large variety of solid propellant grains predesigned with regard to burning surface area characteristics and size.

Like conventional mobile liquid monopropellants, as distinguished from liquid bipropellants, the system requires only one storage container or reservoir and one set of pressuring means, feeding tubes and control valves, thereby simplifying the complexity of the device and reducing weight. There is also no need for combustion catalysts in the combustion chamber.

In operation, the plastic monopropellant is extruded from the storage chamber through a shaping means such as a tube or orifice of any suitable size, shape and number, into the combustion chamber by means of any suitable pressurizing device, such as a piston or bladder actuated by a pressurized fluid or a properly designed pump, which can exert a sufficiently high positive pressure on the monopropellant relative to that in the combustion chamber to keep the propellant flowing into the combustion chamber at a linear rate at least equal to the linear burning rate of the propellant composition and at such higher rates as might be required to obtain desired variation in mass burning rate and gas production. The shaping means, such as a tube or orifice, which can be further provided with means for shaping or recessing the leading end of the material to increase available burning surface area, for a given length of the extruded monopropellant within the combustion chamber, functions substantially as a die forming the extruding material into a cohesive, shape-retaining advancing mass, such as a column or strip, of predetermined shape and of predetermined cross-sectional area, which can be varied by providing means for reducing or increasing the cross-sectional area of the orifice either before or during operation.

The leading face of the extruding column or strip of propellant can be ignited in the combustion chamber by any suitable means, such as an electrical squib, high resistance wire, electric arc or spark gap. The burning leading face thereby provides a constantly generating burning surface, predetermined in size and geometry by the size and shape of the extrusion shaping means, such as a tube or orifice, by any shaping or recessing means associated with the tube or orifice, and by the rate of extrusion, as the end-burning material advances. As aforementioned, the minimum rate of extrusion of the monopropellant must be at least equal to the linear burning rate of the composition and preferably higher to prevent burning back into the propellant storage chamber.

Prior to ignition, the leading face of the extruding propellant mass will generally approximate a plane surface. After ignition, if extrusion rate is about equal to linear burning rate of the composition, burning of the extruding material takes place substantially at the point of entry into the combustion chamber, for example, at the orifice, and the burning surface, which is, in effect, the leading face of the propellant material, retains the form of a transverse plane. At the preferred higher rates of extrusion, a longer column or strip projects into the combustion chamber and, under the influence of the circulating high-temperature combustion gases, burning extends upstream along the exposed surface of the extruding mass within the combustion chamber. When burning equilibrium is reached at a given rate of extrusion which is higher than linear burning rate, the surface of the propellant material protruding into the combustion chamber converges in the downstream direction, forming a downstream edge when the material is extruded as a strip or ribbon, or a downstream apex when the material is extruded through a circular or a rectangular orifice, thereby providing a convergent leading face or end and a burning surface of desired extensive area.

The burning surface area of such sloping configurations is determined by the angle subtended by the converging sides, which is determined by the length of the propellant strip or column protruding into the combustion chamber from the downstream edge or apex to the orifice, which, in turn, is determined largely by the rate of extrusion. The higher the rate of extrusion, the longer is the column or strip, the more acute is the angle subtended by the sloping sides, and the greater is the burning surface. Thus the burning surface area, in which, in turn, determines the mass burning rate and the mass rate of gas generation, can be controlled by varying the rate of extrusion of the monopropellant. Varying the rate of extrusion is obtained by controlled feeding and, thereby, controlled rate of gas generation can thus be achieved. This can be readily accomplished by controlling extrusion pressure on the propellant with the aid of suitable regulatory devices.

Feeding and mass burning surface area can also be varied and controlled by providing suitable shaping means as the propellant mass is extruded from the storage chamber into the combustion chamber. The propellant can be divided into a plurality of substantially separate, extruding, shaped masses of substantially any desired size or configuration, such as columns or strips of any desired cross-sectional shape, or into a plurality of substantially separate shaped masses, some or all of which have their leading faces shaped or recessed by suitable means. The propellant shaping means can be any suitable device for accomplishing the desired shaping or shaping and dividing of an extruding propellant. It can, for example, be an extrusion plate of any desired and suitable strength and depth, provided with a plurality of orifices of any desired and suitable shape and size, spaced at a substantial distance from each other.

One of the problems posed by burning the leading face of a column of plastic monopropellant as it is extruded into a combustion chamber from the propellant storage chamber, is preventing the burning back of the extruding propellant along its peripheral surfaces upstream of the combustion chamber into the orifice passage and into the storage chamber, since, in addition to burning at an unscheduled mass rate, this can cause explosion. This problem is made more acute by the fact that, at equilibrium burning, the entire surface of the mass of monopropellant protruding into the combustion chamber down to the extrusion orifice is in active combustion.

The object of this invention is to provide a method for generating gases by burning the leading face of a mass of plastic monopropellant as the mass is extruded into a combustion chamber, which substantially reduces or eliminates the tendency of the extruding mass of monopropellant to burn back from the combustion chamber through the extrusion means into the monopropellant storage chamber.

A further object is the provision of apparatus for implementing said method.

Other objects and advantages of the invention will be made obvious by the following description.

In the drawings:

FIGURE 1 is a longitudinal cross-sectional view through a diagrammatic embodiment of the invention.

FIGURE 2 is a cross-sectional view along lines 2—2 of FIGURE 1 showing the extruder plate and mass flow control and cut-off device in partially closed position.

FIGURE 3 is a fragmentary cross-sectional view taken on line 3—3 of FIGURE 2.

FIGURE 4 is similar to FIGURE 2 but showing the device in closed position.

FIGURES 5 and 6 are fragmentary perspective views of the equilibrium burning surfaces of strips of extruding mono-propellant at different rates of extrusion.

FIGURE 7 is a plan view of a modified extrusion plate showing circular orifices.

FIGURE 8 is a cross-sectional view along lines 8—8 of FIGURE 7.

FIGURES 9 and 10 are fragmentary perspective views showing the equilibrium cone-shaped burning surfaces formed by columns of extruding monopropellant in the combustion chamber at different rates of extrusion.

FIGURE 16a is a fragmentary vertical sectional view showing a mandrel-type flow-divider and extruding propellant prior to ignition.

FIGURE 16b is similar to FIGURE 16a showing the equilibrium burning surface.

FIGURE 17 is a schematic perspective view of 4 different mandrel-type flow-dividers.

FIGURE 18 is a plan view of still another modified flow-divider shaping means.

FIGURE 19 is a vertical cross-sectional view taken along line 19—19 of FIGURE 18.

Figure 11:
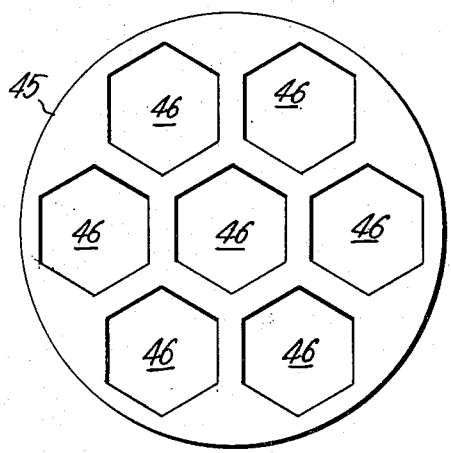
FIGURE 11 is a plan view of a modified extrusion plate showing hexagonal orifices.

Broadly speaking, our invention comprises extruding a plastic monopropellant composition having sufficient cohesive strength to retain a formed shape and capable of continuous flow at ordinary to reduced temperature under pressure, into a combustion chamber, from a storage chamber, through an extrusion plate that separates the storage chamber from the combustion chamber and is provided with orifices of suitable shape and size for passage of the monopropellant into the combustion chamber, and burning the leading faces of the continuously advancing shaped masses of monopropellant in the combustion chamber, the extrusion plate being made throughout of a solid material characterized by low thermal conductivity and preferably also capable of volatilizing when heated to the temperature prevailing in the combustion chamber to form relatively cool gases. The propellant is extruded at a rate at least as high as its linear burning rate and preferably higher.

The low thermal conductivity of the extrusion plate prevents conduction of heat from the combustion chamber along the walls of the orifice passages in the extrusion plate through which the propellant extrudes, so that the propellant in contact with the walls within the extrusion orifices is not heated to ignition temperature. The thermal conductivity of the material forming the extrusion plate should be not greater than 3 B.t.u./hour/sq.ft./° F./ft., and preferably not greater than 1. This requirement excludes metals and other materials, such as graphite, which are excessively heat conductive for our purpose. Many refractory and ceramic materials such as aluminum and other silicates, fireclays, alundum, magnesite, sillimanite, silica, quartz and zirconia, possess the requisite low thermal conductivity as well as excellent strength properties and can be cast or machined into extrusion plates suitable for our purpose. Such refractory materials do not ordinarily form gaseous products even at the high combustion chamber temperatures produced by high flame temperature monopropellants, and will, therefore, hereafter be defined as non-gasifying.

A low thermal-conductivity material which gasifies under the conditions of elevated temperature developed in the combustion chamber is particularly desirable since the relatively low temperature gases thus formed provide an additional important safety factor. Such gases should be non-self-oxidant. This term, as employed here, refers to gases which are either non-combustible or, if combustible, do not contain oxygen or another element, such as chlorine or fluorine, available for combustion. The gas can, of course, contain oxygen or other oxidizing elements combined in such a way, as for example with carbon or hydrogen, that they are not available for oxidation of other components of the same gas molecule or of other molecules present in the gases.

Gasification of the extrusion plate material can be accomplished in any desired manner. The plate can be made of or contain as a component thereof, an inorganic or an organic compound, such as a natural or synthetic polymer, which decomposes upon heating to form gases such as $CO_2$, $H_2$, $H_2O$, and small organic molecules; a compound which volatilizes without chemical change, namely undergoes change of state to a liquid and then to a gas or sublimes directly to a gas, under elevated temperature conditions; or a mixture of both such types of compounds.

To gasify, the material should be so chosen that it changes state or decomposes at the temperature of the hot combustion gases in the combustion chamber, namely below the flame or adiabatic reaction temperature of the monopropellant. Preferably gasification occurs at a temperature close to or not substantially higher than the ignition temperature of the monopropellant composition.

Gasification of the extrusion plate material, either by decomposition or by change of state from a solid to a gas, or from a solid to a liquid and then to a gas, requires a substantial amount of heat energy. The requisite heat is absorbed from the hot combustion gases adjacent to the face of the extrusion plate exposed in the combustion chamber, and the hot gases are thus cooled. The gases evolved by volatilization of the extrusion plate material are relatively cool and, upon admixture with the already cooled combustion gases adjacent to an extrusion plate orifice, reduce the temperature of the gases in contact with that portion of the extruding mass of propellant adjacent to the rim of the orifice at the point of entry of the propellant into the combustion chamber, thereby tending to quench peripheral burning of the advancing propellant mass at the orifice and preventing any burn-back along the walls of the orifice passage that might otherwise take place. Most effective quenching is obtained with extrusion plate materials which volatilize at temperatures below or not substantially higher than the ignition temperature of the monopropellant.

Substantially any solid organic compound volatilizes or decomposes to form gases at the high temperatures developed by burning of the monopropellant in the combustion chamber, so that any such compound having the desired low thermal conductivity can be employed for our purpose. Organic compounds, such as many polymers, having the requisite physical properties, in terms of strength and toughness, can be employed as the basic structural material of the extrusion plate.

Polymers which are particularly suitable for this purpose include polyamides, such as nylon; acrylic and methacrylic resins, such as polymethyl methacrylate; cellulose esters, such as cellulose acetate, propionate and butyrate; cellulose ethers, such as ethyl cellulose; epoxy resins; polyesters, such as the alkyd resins; vinyl polymers, such as polystyrene and polyvinyl chloride; fluorohydrocarbons, such as polytetrafluoroethylene (Teflon); polyurethanes; phenol-aldehydes, such as phenol-formaldehyde; phenol-urea resins; silicones; and the like.

Solid organic compounds, such as oxamide, melamine, anthraquinone, p-benzoyl aminobenzoic acid, 1,5-dihydroxyanthraquinone, 3,4,5-diiodohydroxybenzoic acid, glycocyanine, $\alpha,\alpha'$-hydrazo naphthalene, 2,4,5-triphenyl imidazole, 4-methyl uracil, naphthalic anhydride, phenyl alanine, sulfamino benzoic acid, tetrabromophenolphthalein, tetrabromophthalic anhydride, tetrahydroxy anthraquinone, tetrapropyl ammonium iodide, trimethylamine hydrochloride, indigo, terephthalic acid, tetramethyl ammonium chloride, uramil, uracil, and the like, which do not possess the strength and toughness required for the extrusion plate, but which possess particularly desirable gasification properties, can be dispersed in finely-divided form in the basic structural material of the extrusion plate, which can also be gasifying, such as a synthetic polymer.

Many inorganic compounds which volatilize or decompose into gases at the temperatures prevailing in the combustion chamber, preferably at temperatures not substantially higher than the ignition temperature of the propellant composition, such as calcium phosphate, sodium phosphate, ammonium phosphate, ammonium sulfate, ammonium chloride, antimony oxychloride, sodium, potassium, lithium, calcium and magnesium carbonates and bicarbonates, potassium tetrasilicate, lithium fluorosulfonate, silver bromide, sodium fluoroborate, tellurium tetrabromide, and thallous sulfide, can also be used. Such gasifying inorganic compounds can be dispersed in finely divided state in the basic structural material of the extrusion plate. They can, for example, be dispersed in a solid polymer which forms a gasifying extrusion plate or a component of the extrusion plate material.

The downstream face of an extrusion plate made entirely of a gasifying material tends to retreat in an upstream direction relative to the extruding propellant because of volatilization or decomposition of the surface exposed in the combustion chamber. This is not objectionable if the plate is of adequate thickness so that vaporization does not completely extend, at any point, to the upstream face of the plate in the propellant storage chamber during the scheduled burning period. Gasification does not occur within the orifice passages upstream of the burning zone since the cool monopropellant extruding through the orifice passages prevents gasification.

In some cases, particularly where the burning period is of relatively long duration, it may be desirable to maintain the extrusion plate substantially in its original dimensions. This can be accomplished by combining a gasifying material with a non-gasifying material in such manner that the non-gasifying component remains structurally intact after volatilization of the gasifying component.

A porous vitreous or refractory non-gasifying material, such as felted or woven asbestos, fiberglass, fiberquartz, slag wool, and other fibrous refractory materials, can, for example, be impregnated with a solid polymer, such as those aforedescribed, in any suitable manner. The polymer can be introduced by applying it to the non-gasifying structure in molten form, in solution in a volatile solvent which is subsequently evaporated, or in monomeric or partially polymerized liquid form which is cured into a solid polymer after impregnation of the non-gasifying structural component. Upon hardening or curing of the organic component a strong, rigid structural material consisting, in effect, of a mixture of gasifying and non-gasifying components, is produced. The material can be molded, e.g. during setting or curing of the polymer, or machined into an extrusion plate having extrusion orifices of the desired shape and size. In some cases, it may be necessary to bond together sheets of the impregnated material to produce an extrusion plate of the desired thickness. Such bonding can be achieved by laminating impregnated layers prior to setting or curing the ploymer, or subsequently by means of any suitable adhesive.

A non-gasifying structural base can also be obtained by dispersing a non-gasifying material in the form of flakes or fibers, such as mica, quartz, glass fibers or asbestos fibers, in sufficient amount so that they tend to interlock or mat, in a solid, organic polymer which serves as a bonding agent. Such compositions can be made by admixing the non-gasifying flakes or fibers with the polymer in molten form or in solution in a volatile solvent or with liquid monomers or partially cured polymers which can be cured into the desired solid polymer. Upon gasification of the organic polymer, the non-gasifying component remains as a rigid structure which preserves the original contours of the extrusion plate and which, because of its low thermal conductivity, functions to prevent heat transfer along the interior walls of the extrusion passages in the plate. The presence in the organic polymer of the non-gasifying flakes or fibers also increases the strength and rigidity of the extrusion plate, in many instances.

The composition of the extrusion plate can be tailored to the specific combustion chamber temperatures and monopropellants in particular gas-generating applications. The extrusion plate material or combination of materials can be chosen in accordance with their heat energy absorption requirements for gasification and the temperature, kind, and quantity of the evolved gases.

The extrusion plate through which the plastic monopropellant is extruded and shaped, and which separates the combustion chamber from the monopropellant storage chamber, can be of any suitable size, shape and thickness for the particular use. The orifices therethrough for extrusion of the monopropellant can also be of any suitable number, size and shape. The individual orifices are desirably spaced from each other in such manner that the minimum distance between them on the face of the plate exposed to the combustion chamber is about 50 mils, and preferably about 100 mils. Such substantial spacing of the orifices possesses certain advantages such as providing adequate structural strength to withstand high extrusion pressures, eliminating any tendency of the extruding plastic monopropellant columns to coalesce upon entry into the combsution chamber, and providing for possible variation in size of the individual orifices before or during operation, as illustrated in FIGS. 2 and 3.

In some cases it will be advantageous to introduce into the orifice a flow divider of relatively small cross-sectional area in the plane normal to the path of flow of the propellant. Such flow dividers shape the leading face of the extruding column or strip of plastic monopropellant by producing a recess therein which results in greatly increased burning surface area for a given length of the extruding column or strip in the combustion chamber, thereby making possible increased rates of extrusion and of mass gas generation and smaller combustion chambers.

The flow dividers can be of any suitable configuration and can be positioned in the larger extrusion orifice in any desired manner. Preferably they are of relatively short depth in the plane parallel to propellant flow to minimize frictional resistance and the pressure differential required to maintain extrusion at the desired rate. Where the flow divider is anchored in place by means positioned lengthwise within the orifice passage, such anchoring means is desirably of relatively small surface area, such as a rod, to reduce resistance to flow. Any tendency of the plastic monopropellant to coalesce as it extrudes past the flow divider can be minimized or eliminated by making the divider of adequate width in its smallest transverse dimension and/or by sloping it in such manner as to minimize any laterally convergent flow tendency of the monopropellant, as for example by providing the flow divider with sloping sides converging in the upstream direction.

Because of its small dimensions the flow divider is preferably made of a high strength non-gasifying material such as metal or a refractory or ceramic. The high thermal conductivity of a metal flow divider will not cause burn-back so long as it is of relatively short depth. Any anchoring means for the flow divider passing upstream within the orifice passage should, however, be made of a material of low thermal conductivity, such as a refractory or ceramic.

The flow divider can be a narrow divider, such as a wire, traversing the mouth of the orifice as shown in FIGURES 12, 13, 14 and 15. The wire can be of any desired cross-sectional shape, e.g. triangular as shown, circular, oval, or rectangular. The narrow flow divider can be one or several and can be positioned in an orifice of any shape in any desired manner or configuration. An important advantage of metal wire flow dividers lies in the fact that they can be employed as igniters, as shown diagrammatically in FIGURE 13, both initially to ignite the propellant material and to reignite it for intermittent operation.

A given extruding mass of the plastic monopropellant, such as a column or strip of the material, can also have its leading face shaped or recessed to increase burning surface area by means of a flow divider, so associated with the extrusion tube or orifice and of such dimensions that it is completely within the peripheral boundary of flow of the extruding propellant. Such a flow divider, which will hereinafter be termed a mandrel, produces an axial recess or bore in the leading face of the monopropellant as the latter is extruded around it and thereby exposes additional propellant surface. The shape and cross-sectional area of the recess is determined by the configuration and size of the mandrel, which can be varied as desired. A circular mandrel, such as a cone, produces a cylindrical bore in the unignited material, as shown in FIGURE 16a. When the propellant is ignited, this interiorly exposed surface becomes part of the burning surface and, at burning equilibrium, slopes to a leading edge to form, in the case of a cylindrical bore, an inverted cone within the leading face of the extruding propellant, as shown in FIGURE 16b, thereby considerably increasing burning surface area. The cone angle and depth are determined by the rate of extrusion; the higher the rate, the more acute is the angle and the deeper the cone.

Other shapes of mandrel are indicated in FIGURE 24 in which the reference characters A and C refer respectively to a sphere and cylinder, which produce cylindrical bores, and D to a cube which produces a rectangular bore through the extrusion. The reference character B refers to an elongated body forming a bore of oblong cross section.

The mandrel can be positioned just above the extrusion orifice, just within the extrusion orifice, as illustrated in FIGURES 16a and 16b, or down inside an extrusion tube, as illustrated in FIGURE 19. In the latter case burning takes place within the extrusion tube on the interior, inverted conical surface of the extruding mass and the portion of the tube above the burning surface becomes part of the combustion chamber. Burning within a tube, which can be of any desired cross-sectional shape, has the advantage of supporting the periphery of the extruding mass. Such a peripheral support may be advantageous when the device is subjected to severe accelerative stresses to prevent fragmentation of the material. The mandrel in this case produces the desired large burning surface area. The low thermal conductivity of the extrusion plate material, with or without accompanying gasification, prevents ignition of the extruding column of monopropellant along its outer periphery where it is in contact with the extrusion tube walls within the extrusion plate.

Decreasing the cross-sectional area of an extrusion orifice proportionately decreases the cross-sectional area of the shaped mass of material extruding at a given linear rate of extrusion and, thereby reduces the amount of burning surface area at equilibrium burning. Increasing the size of the orifice has the opposite effect. In the case of an orifice which is substantially longer than it is wide in its transverse dimensions relative to the axis of propellant flow, a decrease in its longer dimension, so long as length remains greater than width, does not change the height of the burning extruding propellant mass at the given linear rate of extrusion at equilibrium burning. If, however, the orifice is reduced in its smaller transverse dimension as, for example, the width of a slot orifice, height of the extruding buring mass at a given linear extrusion rate is reduced, and total burning surface area is reduced in amount proportional to the reduction in orifice area. In the case of a symmetrical orifice, such as a circular orifice, any reduction in cross-sectional area reduces height of the burning extruding mass at a given linear rate of extrusion. By height of the extruding mass is meant the linear distance from its leading edge or apex to the extruding orifice.

Thus it may require two or more narrow orifices to provide the same total burning surface area as would a single wide orifice but such narrower orifices provide the advantages, important in some applications, of permitting use of a shorter combustion chamber, or of substantially increasing the upper limit of extrusion rate. The higher the extrusion rate, the greater is the height of the extruding column or strip. Maximum practical height is determined in some applications by the cohesiveness of the propellant composition, namely the distance to which it can be extruded without sagging under the stress of its own weight, and in other cases by accelerative or vibrational stresses which might cause fragmentation of excessively long extruded masses. The desired conditions in the combustion chamber can be readily obtained by varying the size, number and spacing of the spaced orifices and by the introduction into the orifices of mandrels and narrow flow dividers, as shown in the figures.

The generated high-energy gases can be used to produce thrust as, for example, in the rocket motor of a plane, projectile, or jet-assist take-off unit, or for prime movers such as in a gas turbine, reciprocating engine, or the like. They can be employed to drive torpedoes, helicopters, fluid and jet pumps, auxiliary power supply units and the like.

FIGURE 1 shows diagrammatically a rocket motor device employing our process for generating gases. The monopropellant 1, which is a plastic, cohesive, shape-retaining composition capable of continuous flow under small to moderate pressure, is contained in storage chamber 2. Tank 3 contains a gas, such as air, under high pressure, which feeds into piston chamber 4 via valve regulator 5 and pipe 13 and actuates piston 6, thereby exerting pressure on the propellant, causing it to flow and extrude in the form of strips or ribbons 7 through rectangular slot orifices 8 which are substantially spaced from each other in an extrusion plate 9, made of a refractory material of low thermal conductivity such as alundum, separating the propellant storage chamber from combustion chamber 10 provided with a suitable layer of insulation 11.

A valve regulator system maintains a positive pressure in piston chamber 4 relative to combustion chamber pressure which is sufficiently high to maintain propellant extrusion at the desired extrusion rate, which is at least as high as the linear burning rate of the propellant and preferably higher. A suitable system for this purpose is shown diagrammatically. Regulator 5 contains a cylindrical bore 38 provided with annular grooves 21 and 22 forming annular gas ports which can be completely or partially opened or completely closed by longitudinal motion of cylindrical valves 23 and 24, connected by rod 25 so that they move simultaneously. Tank 3 is connected by pipe 26 with port 21 through which it feeds pressurized gas into pipe 13 and piston chamber 4 in an amount determined by the position of valve 23. When port 21 is open, port 22 is closed. When valve 23 moves to the right sufficiently to close port 21, valve 24 also moves to open port 22 and some pressurizing gas in the piston chamber 4 vents through pipe 13, port 22 and exhaust pipe 27 opening out of port 22, thereby reducing the pressure on the monopropellant and its extrusion rate when necessary. Motion of valves 23 and 24 and, thereby, pressure in the piston chamber 4 and extrusion rate, is controlled by pressure-responsive regulator 28 which is transversely partitioned by diaphragm 29 into two chambers 30 and 31. Tube 12 communicates to chamber 30 the combustion gas pressure in the combustion chamber. Chamber 31 is maintained at a predetermined pressure level by means of tube 32 connected to pressurized gas tank 3 and a regulatory solenoid valve 33. Coil springs 34 and 35 act as restoring forces on the diaphragm to reduction reaction time lag. Motion of the diaphragm is communicated to valves 23 and 24 by connecting rod 36. Bellows 37 serves as a gas seal.

The regulatory system functions as follows. Pressure in chamber 31 is set at the desired level of combustion chamber pressure which in turn is produced by burning of the propellant at a particular, required rate of propellant extrusion. This can readily be calculated from knowledge of the burning characteristics of the particular propellant composition, the total burning surface area presented by the extruding propellant as determined by the cross-sectional area of the extruding orifices and other known factors such as the size and shape of the combustion chamber and the Venturi nozzle. So long as this desired combustion chamber pressure is maintained, diaphragm 29 is in neutral position and pressurizing gas is fed through part 21 into the piston chamber in the required amounts to maintain the requisite rate of extrustion. If combustion chamber pressure drops, the diaphragm is pushed to the left, valve 23 moves to the left, more pressurizing gas is fed into the piston chamber, extrusion rate increases, mass burning rate increases, and combustion chamber pressure is increased to the desired level. If combustion chamber pressure rises beyond the desired level, the diaphragm moves to the right, port 21 closes, exhaust port 22 opens and sufficient gases vent from the piston chamber to reduce extrusion rate to the requisite degree.

The system can be further controlled to regulate and vary the rate of extrusion to meet variations in operating requirements during the burning cycle by means of solenoid valves 33 and 34, which can be preprogrammed or voluntarily controlled to increase or decrease the regulating pressure in chamber 31. Valve 34 and exhaust tube 35 permit venting of gas from chamber 31 when a reduction in extrusion rate is desired.

Transversely slidable plate 15 made of a low thermal-conductivity refractory material, such as alundum, is provided with rectangular slot orifices 16 which are similar in size, shape, and spacing to orifices 8 in extrusion plate 9 so that in a given position of plate 15, orifices 16 and 8 are in registry and both open to their fullest extent as shown. The slidable plate orifices are each provided with a shearing edge 14. Transverse slidable motion of the plate is produced by motor 17 which can be remote-controlled. Undesirable lateral motion of plate 15 is checked by pin and slot guide 20 and 20a. The propellant extruded into the combustion chamber is not burning, as shown, but ignition can be initiated by resistance wire igniter 18 of which there may be more than one. The high pressure gases generated after burning is initiated vent through rocket nozzle 19 at high velocity to produce thrust.

Slidable plate 15 can be used to reduce mass flow of the propellant by being moved into a position across extrusion orifices 8, as shown in FIGURES 2 and 3 wherein it reduces their effective size, or it can be employed as a cut-off device completely to stop flow by covering the entire extrusion orifice, as shown in FIGURE 4.

FIGURES 5 and 6 show the downstream sloping or substantially V-shape configuration of the burning surface or leading face 7a of the extruding strip of monopropellant of FIGURE 1 in the combustion chamber when equilibrium or steady-state burning has been reached at different rates of extrusion. The rate of extrusion in FIGURE 6 is higher than in FIGURE 5 so that height of the extruded portion of the strip is greater, the sides of the V-shaped face slope more steeply, and burning surface area 7b is greater. The low thermal conductivity of the refractory extrusion plate material minimizes the hazard of heating of the orifice passage walls to a temperature which would ignite the propellant within them.

FIGURES 7 and 8 show a modified extrusion plate 40, made of a gasifying solid organic polymer of low thermal conductivity, such as nylon, Teflon, or the like, provided with circular extrusion orifices 41a and 41b, the peripheral orifices 41a being of somewhat larger cross-sectional area. FIGURES 9 and 10 show the cone-shaped equilibrium burning surfaces 42 and 42a formed by the leading face of propellant extruding through a circular orifice, such as shown in FIGURE 7, at different rates of extrusion, that of FIGURE 10 being higher and, therefore, providing greater burning surface area.

FIGURE 11 shows still another modification of a solid plastic extrusion plate 45 having hexagonal extrusion orifices 46 therethrough. Such a configuration has the advantage of providing a maximum ratio of orifice cross-sectional area to total cross-sectional area of the extrusion plate for a given desirable minimum distance between orifices.

Figure 12:
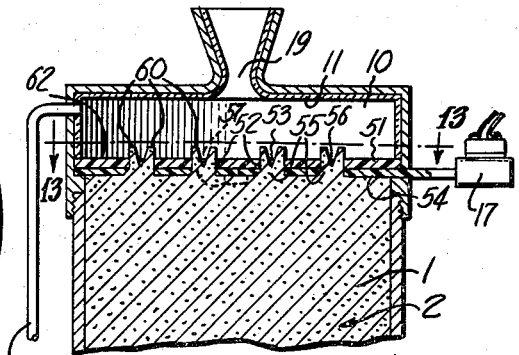
FIGURE 12 is vertical sectional view of a modified form of the device.
Figure 13:
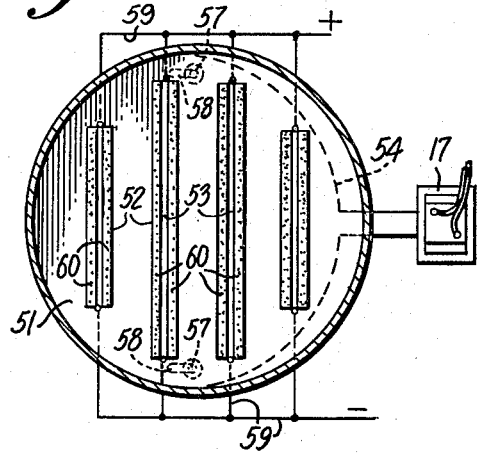
FIGURE 13 is a horizontal sectional view taken along the line 13—13 of FIGURE 12.
Figure 14:
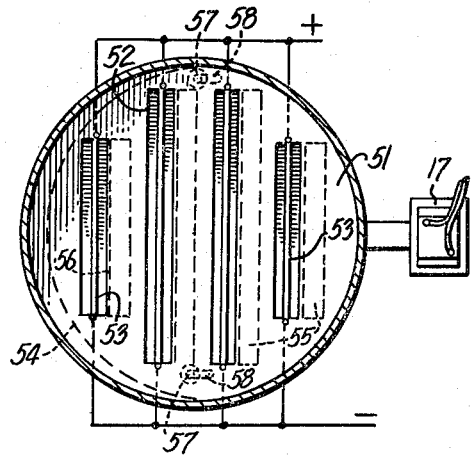
FIGURE 14 is a view similar to FIGURE 13 but showing the device in closed position.
Figure 15:
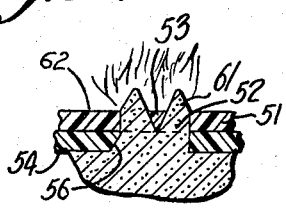
FIGURE 15 is a fragmentary sectional view of the equilibrium burning surface of the extruding monopropellant.

FIGURE 12 is substantially similar to the device of FIGURE 1 with the following modifications. Extrusion plate 51 is made of a tough solid plastic, such as nylon, Teflon, or the like, and is provided with slot orifices 52, each of which has a longitudinal flow-divider 53 in the form of a metal wire of triangular cross section as shown. The wire flow-divider in effect divides the larger orifices 52 into narrower orifices. Cut-off plate 54 made of a tough, solid plastic, such as nylon, Teflon, or the like, and provided with orifices 55, shown in registry with orifices 52 in FIGURES 12, 13 and 15 and having shear edge 56, is positioned beneath the extrusion plate and can be shifted laterally by motor 17 to cut off flow of monopropellant through orifices 52 as shown in FIGURE 14. Guide pins 57 and slots 58 hold the cut-off plate in position against the extrusion plate and prevent undesirable sidewise motion. The flow dividers 53 are high resistance wires which can be employed as igniters by connecting them by means of properly insulated wires 59 to a source of electric current, as shown diagrammatically in FIGURES 13 and 14. Prior to ignition the monopropellant extrudes in pairs of substantially plane-surfaced narrow strips or ribbons 60 as shown in cross-section in FIGURE 12. After ignition, when equilibrium burning is reached, the burning surfaces 61 assume the downstream-convergent configuration shown in FIGURE 15. Face 62 of the solid plastic extrusion plate 51 exposed to the hot combustion gases in the combustion chamber is heated to its decomposition temperature and produces relatively cool gases at the point of entry of the monopropellant out of orifice 52 into the combustion chamber, which quench ignition at the mouth at the orifice, and which, in combination with the low thermal conductivity of the solid plastic prevents burn-back of monopropellant upstream from the orifice mouth.

FIGURES 16a and 16b illustrate the shaping and recessing effect of a conical mandrel 87 positioned at the mouth of extrusion orifice 88 in extrusion plate 89. The mandrel is anchored by means of ceramic rod 90 and ceramic spider 91. The mandrel shapes a recess 92 in the leading face 93 of the extruding propellant which is a cylindrical bore as shown in FIGURE 16a prior to ignition and provides additional exposed surface. At equilibrium burning the burning surface slopes downstream as shown in FIGURE 16b to form an annular conical face 94 having a central conical recess 95.

FIGURE 17 illustrates diagrammatically several differently shaped mandrels which can be used as flow dividers.

FIGURES 18 and 19 show a plurality of extrusion orifices or tubes 110 in extrusion plate or partition 111 made of non-gasifying asbestos fibers bonded with a gasifying solid organic polymer. The propellant 1 is extruded from storage chamber 112 into extrusion tubes 110 where it flows past spherical mandrels 113 positioned within the tubes at a point substantially below their downstream ends. The leading face of the propellant mass extruding within each tube is recessed by the mandrel 113. Burning takes place within the tube and at equilibrium the burning surface assumes the shape of an inverted cone 114, as shown, with the outer periphery of the mass supported by the walls of the extrusion tube. Burning of the column of propellant at its outer periphery is prevent by the low thermal conductivity of the extrusion tube walls and some gasification where the extrusion plate comes in contact with the hot combustion gases. The portion of each tube downstream of the burning surface forms part of the combustion chamber 115. The mandrels are held in position by ceramic rods 116 and ceramic spider 117.

As aforementioned, the monopropellant should possess certain requisite physical characteristics. It should be sufficiently cohesive to retain its shape for an appreciable length of time when extruded. Preferably also, its cohesive strength should be sufficiently high to withstand fragmentation under the given conditions in the combustion chamber. This is of importance not only for control of the desired burning surface area, but to avoid loss or wastage of unburned propellant in some applications, as for example, rocket motors, by venting of the material out of the nozzle under such conditions as high acceleration. This is frequently a problem in the case of the burning of atomized mobile liquid propellants, some unburned particles of which fly out of the rocket nozzle. The degree of cohesive strength desirable is determined to some extend by the particular stresses developed in a particular use and the particular burning conditions as, for example, the unsupported length of the extruding, burning mass. Cohesive strength is closely related to the tensile strength of the material. In general, for the desired shape-retentivity, the monopropellant material should preferably have a minimum tensile strength of about 0.01 lb./sq. in., preferably about 0.03 p.s.i. or higher.

The cohesiveness or substantial tensile strength of the monopropellant maintains stability and uniform dispersion of its components, as, for example, in the case of two-phase systems containing dispersed insoluble, solid oxidizer. This is of considerable importance, since it ensures uniformity of burning rate at the constantly generating burning surface as the end-burning material advances, thereby assuring a constant or controllable rate of gas generation.

The monopropellant, furthermore, should be extrudable of ambient temperatures, namely, should be capable of continuous flow, preferably under relatively moderate pressure differentials. Materials which are extrudable only at elevated temperature or which require excessively high pressures to initiate and maintain flow present problems which make them generally unsuitable. In general, it is desirable to employ a material which flows at a maximum shear stress of about 1 p.s.i. at the wall of the tube or orifice through which it is being extruded. In some applications, the shear stress point can be higher, as, for example, up to about 10 p.s.i. or more, where stronger pressurizing means for extrusion are feasible.

The controllable feeding of a monopropellant having both shape-retentiveness and fluidity under stress substantially eliminates still another difficulty encountered with solid propellants housed in the combustion chamber, namely, the dangers of fracturing or cracking of the solid propellant which can so enormously increase burning surface area and the amount of gases produced as to cause explosion of the combustion chamber. The brittleness and fissuring characteristic of many solid propellants at low ambient temperatures is no problem with monopropellants having the physical characteristics requisite for our purpose since they can either be formulated so as to have exceedingly low freezing points or, upon warming to ambient temperatures of use, regain their flow characteristics and form a continuous, unbroken mass during pressure extrusion.

Substantially any monopropellant composition having the requisite physical characteristics, as for example, gelled liquid monopropellants such as hydrazine nitrate, nitromethane, or ethylene oxide containing a suitable gelling agent can be employed. One of the important advantages of the invention, however, stems from the fact that the process makes possible the utilization of propellant compositions possessing the highly desirable characteristics of solid propellants in terms, for example, of the high density and high impulse required for high performance levels and reduced storage volume requirements with the important concomitant advantages of propellant feed control and, thereby, control of gas generation under varying circumstances.

Double-base propellant compositions comprising nitrocellulose gelatinized with nitroglycerin with or without, but preferably with, an inert, non-volatile plasticizer such as triacetin, diethyl phthalate, dibutyl phthalate or dibutyl sebacate, to reduce impact sensitivity, in proportions producing a soft gel having the requisite shape retentiveness and flow characteristics are suitable for use. Such relatively high-density, high-impulse propellants have hitherto been utilized only as solid propellants with the predesigning, presizing and other disadvantages entailed by this mode of use.

In general, gel compositions comprising about 3 to 25% nitrocellulose dissolved in nitroglycerin, desirably diluted with at least about 10%, preferably at least 20 to 30% by weight based on total liquid, of an inert plasticizer solvent to reduce sensitivity, possess the requisite physical properties. Such soft gel compositions also have the advantage of being admixable with finely divided insoluble solid oxidizer such as the ammonium, sodium, and potassium perchlorates and nitrates, to provide for combustion of the inert plasticizer, while retaining the desired shape-retentive, extrudable characteristics. Other highly active propellant liquids, such as pentaerythritol trinitrate, 1,2,4-butanetriol trinitrate, and diethylene-glycol dinitrate, which normally are too sensitive for use as mobile liquid monopropellants, can also be gelatinized with nitrocellulose, with or without inert plasticizer diluent and with or without finely divided solid, insoluble oxidizer, to provide monopropellants of substantially higher density than presently usable mobile liquid monopropellants.

Still another advantage of the process lies in the fact that it makes possible combustion with controllable feeding and gas generation rates of heterogeneous monopropellants which are characterized not only by high density and high impulse, but also by the high autoignition temperature, low shock- and impact-sensitivity, non-corrosiveness and nontoxicity of many of the presently used solid composite-type propellants, which make them safe to handle, to transport and to store for extended periods of time under substantially any environmental temperature conditions likely to be encountered. By heterogeneous is meant a two-phase system wherein a finely divided, solid oxidizer is dispersed in an organic liquid fuel in which the oxidizer is insoluble. Spraying or atomization into a combustion chamber of dispersions of a solid oxidizer in a liquid fuel, even where the solid is present in sufficiently small amounts so that the slurry is free-flowing, is not feasible. The solid tends to clog the small atomization orifices. Comminution of the composition into a finely divided spray in the combustion chamber also poses reaction problems because of the difficulty in maintaining the solid oxidizer phase and the liquid fuel phase in properly proportioned contact for complete oxidation.

Heterogeneous monopropellant compositions which are particularly advantageous comprise stable dispersions of finely divided, insoluble solid oxidizer in a continuous matrix of a nonvolatile, substantially shock-insensitive liquid fuel, the composition having sufficiently high cohesive strength to form a plastic mass which maintains the solid oxidizer in stable, uniform dispersion and which, while capable of continuous flow at ambient temperatures under stress, nevertheless retains a formed shape for an appreciable length of time. The compositions, which preferably are soft gels, possess the characteristics of non-Newtonian liquids, namely yield to flow only under a finite stress.

The liquid fuel can be any oxidizable liquid which is preferably high boiling and substantially nonvolatile, which is preferably free-flowing or mobile at ordinary temperatures, and which is substantially inert or insensitive to shock or impact. The latter characteristic can be achieved by employing an oxidizable liquid, at least about 50% by weight of which is an inert compound requiring an external oxidizer for combustion. For special applications, an active liquid fuel containing combined oxygen available for combustion of other components of the molecule, such as nitroglycerin, diethylene glycol dinitrate, pentaerythritol trinitrate or 1,2,4-butanetriol trinitrate, can be admixed with the inert fuel component, such dilution serving substantially to nullify the sensitivity of the active component.

The inert liquid fuel is preferably an organic liquid which, in addition to carbon and hydrogen, can contain other elements such as oxygen, nitrogen, sulfur, phosphorus or silicon and which meets the aforedescribed requirements in terms of physical and chemical properties. Such liquid fuels include hydrocarbons, e.g., triethyl benzene, dodecane and the like; compounds containing some oxygen linked to a carbon atom, such as esters, e.g., dimethyl maleate, diethyl phthalate, dibutyl oxalate, dibutyl sebacate, dioctyl adipate, etc.; alcohols, e.g., benzyl alcohol, diethylene glycol, triethylene glycol, etc.; ethers, e.g., methyl $\alpha$-naphthyl ether; ketones, e.g., benzyl methyl ketone, phenyl o-tolyl ketone, isophorone; acids, e.g., 2-ethylhexoic acid, caproic acid, n-heptylic acid, etc.; aldehydes, e.g., cinnamaldehyde; nitrogen-containing organic compounds such as amines, e.g., N-ethylphenylamine, tri-n-butylamine, diethyl aniline; nitriles, e.g., caprinitrile; phosphorus-containing compounds, e.g., triethyl phosphate; sulfur-containing compounds, e.g., diethyl sulfate; pentamethyl disiloxyl-methyl methacrylate, viscous liquid polymers, such as polyisobutylene, and many others.

The solid oxidizer can be any suitable, active oxidizing agent which yields oxygen readily for combustion of the fuel and which is insoluble in the liquid fuel vehicle. Suitable oxidizers includes the inorganic oxidizing salts, such as ammonium, sodium, potassium and lithium perchlorate or nitrate, and metal peroxides such as barium peroxide. The solid oxidizer should be finely divided, preferably with a maximum particle size of about 300 to 600 microns, to ensure stable, uniform dispersion of the oxidizer in the liquid fuel so that it will not separate or sediment despite lengthy storage periods, although some somewhat larger particles can be maintained in gelled compositions without separation.

The amount of liquid fuel vehicle in the composition is critical only insofar as an adequate amount must be present to provide a continuous matrix in which the solid phase is dispersed. This will vary to some extent with the particular solids dispersed, their shape and degree of subdivision and can readily be determined by routine test formulation. The minimum amount of liquid required generally is about 8%, usually about 10%, by weight. Beyond the requisite minimum any desired proportion of liquid fuel to dispersed solid can be employed, depending on the desired combustion properties, since the desired cohesive, shape-retentive properties can be obtained by additives such as gelling agents. Where the requisite cohesiveness and plasticity are obtained by proper side distribution of the finely divided solid, without an additional gelling agent, the amount of solid incorporated should be sufficient to provide the consistency essential for shape-retentiveness. This will vary with the particular liquid vehicle, the particular solid and its size distribution and can readily be determined by routine testing. The requisite physical properties of the plastic heterogeneous monopropellant can also be obtained without the use of a gelling agent by employing a viscous liquid vehicle, such as a relatively low molecular weight liquid polymer.

Thixotropic, plastic, shape-retentive compositions having the desired flow characteristics can be made by incorporating sufficient finely divided solid, insoluble oxidizer into the liquid fuel to make an extrudable mass when particles are so distributed that the minimum ratio of size of the largest to the smallest particles is about 2:1 and preferably about 10:1. At least 90% of the particles by weight should preferably have a maximum size of about 300 microns. Above this, a small proportion by weight up to about 600 microns can be tolerated.

It is sometimes desirable to incorporate a gelling agent in the solid oxidizer-liquid fuel dispersion. Such gels possess the desired dispersion stability, cohesiveness, shape-retentiveness and flow characteristics. Any gelling agent which forms a gel with the particular liquid fuel can be employed. Examples of compatible gelling agents include natural and synthetic polymers such as polyvinyl chloride; polyvinyl acetate; celloulose esters, e.g., cellulose acetate and cellulose acetate butyrate; cellulose ethers, e.g., ethyl cellulose and carboxymethyl cellulose; metal salts of higher fatty acids such as the Na, Mg and Al stearates, palmitates and the like; salts of naphthenic acid; casein; karaya gum; gelatin; bentonite clays and amine-treated bentonite clays; etc. Organic gelling agents are preferred since they can also serve as fuels. The amount of gelling agent employed is largely determined by the particular liquid fuel, the particular gelling agent, the amount of dispersed solid, and the specific physical properties desired.

Particle size distribution of the dispersed solids is generally not an important factor in imparting cohesive, plastic properties to the composition and in minimizing separation where a gelling agent is employed since these factors are adequately provided for by the gel. Even some substantially large solid particles as, for example, up to about 1000 microns, can be held in stable dispersion. However, the presence of different size particles is often desirable because of the improved packing effect obtained, in terms of increased amounts of solids which can be incorporated.

Finely divided, solid metal powders, such as Al, Mg, Zr, B, Be, Ti, Si, or the like, can be incorporated in the monopropellant compositions as an additional fuel component along with the liquid fuel. Such metal powders possess the advantages both of increasing density and improving specific impulse of the monopropellant because of their higher heats of combustion. The metal particles should preferably be within a size range of 0.25 to 50 microns. The amount of such metal fuel added is not critical but is determined largely by the specific use and the requisite physical characteristics of the composition as aforedescribed. For example, it should not be incorporated in such large amounts that the mixture either becomes granular in texture or deficient in amount of oxidizer. In general the maximum amount of metal powder which can be introduced while maintaining the desired physical properties of the composition and an adequate amount of solid oxidizer is about 45% by weight, and depends upon the density of the metal and its chemical valence or oxidant requirement for combustion.

Stoichiometric oxidizer levels with respect to the liquid fuel or liquid plus powdered metal fuels are sometimes desirable for applications where maximum heat release is wanted. Actual stoichiometric amounts of oxidizer vary, of course, with the particular fuel components and the particular oxidizer and can readily be computed by anyone skilled in the art. The requisite high concentrations of solid oxidizer for stoichiometry can generally be readily incorporated, particularly where the liquid fuel contains some combined oxygen as aforedescribed, while maintaining its essential physical characteristics.

In some cases, as for example, where the monopropellant is being employed in a gas generator for driving a turbine, reciprocating engine, or the like, as a source of gas pressure, or to provide heat energy, the amount of oxidizer can be less than stoichiometric so long as sufficient is introduced to maintain active combustion and a desired level of gas generation. The presence of an active liquid fuel component, namely a fuel containing oxygen available for combustion, reduces, of course, the amount of solid oxidizer required both for stoichiometric and less than stoichiometric combustion levels.

*Example I*

The test apparatus was a cylindrical rocket motor of 2 inch internal diameter, comprising a combustion chamber provided with an exhaust nozzle 0.199 in. in diameter for the high pressure combustion gases, an extrusion plate ¼ inch thick, made of nylon, and provided with 18 circular orifices, as shown in FIGURES 7 and 8, the minimum spacing between orifices being 0.1 inch, the 11 peripheral orifices being 0.3125 inch in diameter and the 7 others being 0.250 inch in diameter, and a propellant storage chamber separated from the combustion chamber by the nylon extrusion plate and containing the plastic monopropellant. The decomposition temperature of the nylon comprising the extrusion plate was 265° C.

The heterogeneous cohesive, shape-retaining, plastic monopropellant used was a mixture consisting in parts by weight of 75 parts of finely divided ammonium perchlorate (14,000 r.p.m. grind), 7.5 parts viscous liquid polyisobutylene, average mol. wt. 8700–10,000 (Vistanex LM-Type MS), 11.25 parts viscous liquid polyisobutylene, average mol. wt. 840 (Oronite No. 24), 6.25 parts dibutyl phthalate, and 0.5 part copper chromite. Ignition temperature of the monopropellant composition was 320° C.

The propellant was extruded from the storage chamber through the orifices of the nylon extrusion plate to form columns ¼ inch long protruding into the combustion chamber. Further extrusion was then discontinued. The protruding columns of monopropellant, after ignition in the combustion chamber, burned back to the face of the extrusion plate exposed to the combustion chamber and then snuffed out, indicating a quenching action at the nylon surface due to decomposition gasification of the nylon.

*Example II*

A test apparatus was employed similar to that of Example I, exceut that the nozzle throat diameter was 0.145 inch and the nylon extrusion plate was 2 inches thick. A heterogeneous plastic monopropellant similar to that of Example I was extruded into the combustion chamber at a mass flow rate of 0.0217 lb./sec. and a linear flow rate of 0.343 in./sec. The propellant columns extruding into the combustion chamber were ignited and burning of the extruding propellant continued for 37 seconds without burn-back into the extrusion plate. The measured median combustion chamber pressure was 156 p.s.i.a. The linear burning rate of the monopropellant as measured in a strand burner at the same pressure was 0.168 in./sec.

Examples 3 and 4 describe in detail cohesive, shape-retaining, extrudable, heterogeneous monopropellant compositions suitable for use in our process and gas-generating apparatus.

*Example III*

74.2% ammonium perchlorate (a mixture of 1725 r.p.m. and 14,000 r.p.m. grinds in a ratio of 1:2, 4–400 microns, 98% by weight under 300 microns), 24.8% triacetin and 1% copper chromite were admixed at room temperature. The resulting composition was a cohesive shape-retentive mass which could be made to flow continuously under moderate pressure. The composition had an autoignition temperature of 275° C. and an impact sensitivity of 80/85 cm. with a 3.2 kg. weight. Burning rate of the material at atmospheric pressure was 0.04 in./sec.

*Example IV*

A gel was made with 75% ammonium perchlorate (1725 and 14,000 r.p.m. grinds, 1:2), 24% dibutyl sebacate and 1% polyvinyl chloride. The polyvinyl chloride was mixed with the dibutyl sebacate and heated to 172° C. to form a gel, which was cooled and loaded with the ammonium perchlorate. The composition was a plastic, shape retentive mass having a tensile strength of 0.31 p.s.i. Length of an extruded column before breaking under its own weight was 5 inches. Shear stress at the wall required to initiate flow in a 3/8 inch diameter tube was 0.035 p.s.i.

The dispersion was highly stable as shown by vibrator tests at 60 cycles and an acceleration of 4 $g$. No separation occurred after 185 hours. The material was also tested by centrifuge at an acceleration of 800 $g$ and showed no separation after 30 minutes. Autoignition temperature of the composition was 286° C. and its solidification or freezing point —18° C. The composition extruded as a shaped mass through a 12 inch tube with 0.375 inch bore at a rate of 0.25 in./sec. under a pressure of 11 p.s.i.g. Linear burning rate of the material at 70° F. and 1000 p.s.i. was 0.46 in./sec.

Although this invention has been described with reference to illustrative embodiments thereof, it will be apparent to those skilled in the art that the principles of this invention may be embodied in other forms but within the scope of the appended claims.

We claim:

1. The process for generating gases which comprises feeding a continuous mass of plastic monopropellant composition which burns to produce gaseous combustion products through a shaping orifice into a combustion chamber at a rate at least as high as the linear burning rate of the propellant material, said composition having sufficient cohesive strength to retain a formed shape, requiring a finite stress to produce flow, being capable of continuous flow at ambient temperature under a maximum shear stress at a wall of about 10 p.s.i., and having a minimum tensile strength of about .01 p.s.i., said orifice being bounded by a solid material having a low maximum thermal conductivity of about 3 B.t.u./hr./sq./ft./° F./ft. and burning the leading face of the advancing, continuous, shaped mass within said combustion chamber, said leading face forming the burning surface of the extruding propellant, the low thermal conductivity of the solid material bounding the orifice serving to inhibit burn-back of the extruding propellant burning in the combustion chamber.

2. The process of claim 1 in which the plastic monopropellant composition is fed into the combustion chamber through a plurality of shaping orifices bounded by a solid material having a maximum thermal conductivity of about 3 B.t.u./hr./sq./ft./° F./ft.

3. The process of claim 1 in which the solid material bounding said shaping orifice is capable of producing gases when heated by the hot combustion gases in the combustion chamber, the low thermal conductivity and gas forming properties of said material serving to inhibit burn-back of the extruding propellant burning in the combustion chamber.

4. The process of claim 3 in which the plastic monopropellant is extruded through a plurality of shaping orifices bounded by a solid material having the characteristics defined in claim 3.

5. The process of claim 3 in which the burning surface area of the extruding propellant and, thereby, the mass rate of gas generation, are controlled by varying the cross-sectional area of the shaping orifice.

6. The process of claim 4 in which the burning surface area of the extruding propellant and, thereby, the mass rate of gas generation, are controlled by varying the cross-sectional area of the shaping orifices.

7. The process of claim 3 in which the burning surface area of the extruding propellant and, thereby, the mass rate of gas generation, are controlled by varying the rate of extrusion of the monopropellant into the combustion chamber.

8. The process of claim 3 in which the leading face of the advancing shaped mass of plastic monopropellant entering the combustion chamber is recessed by positioning a flow divider, of relatively small cross-sectional area relative to the cross-sectional area of said shaping orifice, in the path of flow of said advancing shaped mass of monopropellant.

9. The process of claim 4 in which the shaping orifices are sufficiently spaced from each other at the point of entry of the extruding propellant into the combustion chamber to avoid coalescence of the advancing shaped propellant masses.

10. The process of claim 9 in which the leading face of each of the advancing shaped masses of plastic monopropellant entering the combustion chamber is recessed by positioning a flow divider, of relatively small cross-sectional area relative to the cross-sectional area of the shaping orifice, in the path of flow of each of said advancing shaped masses of monopropellant.

11. The process of claim 3 in which the material bounding the orifice is a solid organic polymer.

12. The process of claim 11 in which the organic polymer contains, dispersed therein, a different finely divided material capable of producing gases when heated by the hot combustion gases.

13. The process of claim 3 in which the solid material bounding the orifice comprises an inorganic refractory component and a solid organic polymer.

14. The process of claim 1 in which the solid material bounding the orifice is a ceramic.

15. The process of claim 11 in which the organic polymer is a polyamide.

16. The process of claim 1 in which the monopropellant consists essentially of a stable dispersion of a finely divided, insoluble, inorganic, solid oxidizer, in an amount sufficient to maintain active combustion of said monopropellant, in a continuous matrix of an oxidizable, substantially non-volatile organic liquid fuel, all components of which are high-boiling and contain molecularly combined carbon and hydrogen, said liquid fuel comprising at least about 8% by weight of the composition.

17. The process of claim 3 in which the monopropellant consists essentially of a stable dispersion of a finely divided, insoluble, inorganic solid oxidizer, in an amount sufficient to maintain active combustion of said monopropellant, in a continuous matrix of an oxidizable, substantially non-volatile organic liquid fuel, all components of which are high boiling and contain molecularly combined carbon and hydrogen, said liquid fuel comprising at least about 8% by weight of the composition.

18. The process of claim 1 in which the monopropellant consists essentially of a stable dispersion of a finely divided, insoluble, solid, inorganic oxidizer in a continuous matrix of an oxidizable, organic liquid fuel, all components of which have a maximum vapor pressure of about 25 mm. Hg at 100° C., said liquid fuel comprising at least about 8% by weight of said composition and consisting essentially of at least about 50% of an inert organic liquid compound containing molecularly combined carbon and hydrogen and requiring an external oxidizer for combustion, and from 0 to about 50% of an active organic liquid compound containing combined oxygen available for oxidization of other components of said active compound, said active compound containing a radical selected from the group consisting of nitroso, nitro, nitrite, and nitrate, said oxidizer being present in sufficient amount to maintain active combustion of the inert fuel in the absence of any oxidizer external to said monopropellant composition.

19. The process of claim 3 in which the monopropellant consists essentially of a stable dispersion of a finely divided, insoluble, solid, inorganic oxidizer in a continuous matrix of an oxidizable, organic liquid fuel, all components of which have a maximum vapor of about 25 mm. Hg at 100° C., said liquid fuel comprising at least about 8% by weight of said composition and consisting essentially of at least about 50% of an inert organic liquid compound containing molecularly combined carbon and hydrogen and requiring an external oxidizer for combustion, and from 0 to about 50% of an active organic liquid compound containing combined oxygen available for oxidization of other components of said active compound, said active compound containing a radical selected from the group consisting of nitroso, nitro, nitrite, and nitrate, said oxidizer being present in sufficient amount to maintain active combustion of the inert fuel in the absence of any oxidizer external to said monopropellant composition.

20. The process of claim 17 in which said organic liquid fuel has incorporated, therein, a minor proportion of a gelling agent selected from the group consisting of natural organic polymers, synthetic organic polymers, salts of higher fatty acids, salts of naphthenic acid, and bentonite clays.

21. The process of claim 3 in which the monopropellant composition comprises a gel of nitrocellulose in an organic liquid fuel containing combined oxygen available for combustion in the form of a radical selected from the group consisting of nitroso, nitro, nitrite, and nitrate.

22. The process of claim 17 in which the monopropellant composition contains in addition a dispersed finely divided metal fuel.

References Cited in the file of this patent
UNITED STATES PATENTS

| | | |
|---|---|---|
| 2,530,493 | Van Loenen | Nov. 21, 1950 |
| 2,570,990 | Southern et al. | Oct. 9, 1951 |
| 2,688,920 | Jarvis | Sept. 14, 1954 |
| 2,702,984 | Britton et al. | Mar. 1, 1955 |
| 2,729,936 | Britton | Jan. 10, 1956 |
| 2,779,281 | Maurice et al. | Jan. 29, 1957 |
| 2,971,097 | Corbett | Feb. 7, 1961 |
| 2,988,879 | Wise | June 20, 1961 |

FOREIGN PATENTS

| | | |
|---|---|---|
| 582,621 | Great Britain | Nov. 22, 1946 |

OTHER REFERENCES

Jet Propulsion, Air Technical Service Command, The Jet Propulsion Laboratory, Calif. Inst. of Technology (1946), p. 152.

UNITED STATES PATENT OFFICE
CERTIFICATE OF CORRECTION

Patent No. 3,126,701                          March 31, 1964

Charles B. Henderson et al.

It is hereby certified that error appears in the above numbered patent requiring correction and that the said Letters Patent should read as corrected below.

Column 1, line 65, for "lxed" read -- fixed --; column 2, line 38, for "washing" read -- wasting --; column 4, line 1, for "operatioin" read -- operation --; column 5, line 8, strike out "in", first occurrence; column 8, line 61, for "ploymer" read -- polymer --; column 9, line 29, for "combsution" read -- combustion --; column 12, line 3, for "reduction" read -- reduce --; line 20, for "part" read -- port --; column 16, line 70, for "side" read -- size --; column 17, line 52, for "higher" read -- high --; column 18, line 50, for "exceut" read -- except --; column 19, lines 46 and 58, for "sq./ft.", each occurrence, read -- sq. ft. --.

Signed and sealed this 18th day of August 1964.

(SEAL)
Attest:

ERNEST W. SWIDER                                EDWARD J. BRENNER
Attesting Officer                                Commissioner of Patents